US012597672B2

(12) United States Patent
Han et al.

(10) Patent No.: US 12,597,672 B2
(45) Date of Patent: Apr. 7, 2026

(54) BATTERY MODULE AND BATTERY PACK INCLUDING THE SAME

(71) Applicant: LG ENERGY SOLUTION, LTD., Seoul (KR)

(72) Inventors: Honggoo Han, Daejeon (KR); Won Kyoung Park, Daejeon (KR); Junyeob Seong, Daejeon (KR); Hyun Seop Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 522 days.

(21) Appl. No.: 18/010,179

(22) PCT Filed: Oct. 18, 2021

(86) PCT No.: PCT/KR2021/014441
§ 371 (c)(1),
(2) Date: Dec. 13, 2022

(87) PCT Pub. No.: WO2022/086075
PCT Pub. Date: Apr. 28, 2022

(65) Prior Publication Data
US 2023/0299411 A1 Sep. 21, 2023

(30) Foreign Application Priority Data

Oct. 19, 2020 (KR) ........................ 10-2020-0135446

(51) Int. Cl.
*H01M 50/271* (2021.01)
*H01M 10/653* (2014.01)
(Continued)

(52) U.S. Cl.
CPC ....... *H01M 50/271* (2021.01); *H01M 10/653* (2015.04); *H01M 10/6554* (2015.04);
(Continued)

(58) Field of Classification Search
CPC ............. H01M 50/271; H01M 50/262; H01M 50/211; H01M 50/507; H01M 10/653; H01M 10/6554
See application file for complete search history.

(56) References Cited

U.S. PATENT DOCUMENTS

2016/0248070 A1 8/2016 Ahn
2016/0271905 A1 9/2016 Lo
(Continued)

FOREIGN PATENT DOCUMENTS

CN 106450090 A 2/2017
CN 110870094 A 3/2020
(Continued)

OTHER PUBLICATIONS

European Search Report for European Application No. 21883146.9, dated Jul. 18, 2024.
(Continued)

*Primary Examiner* — Jonathan G Jelsma
(74) *Attorney, Agent, or Firm* — Birch, Stewart, Kolasch & Birch, LLP

(57) ABSTRACT

A battery module includes first and second cell block assemblies including a battery cell stack and a busbar frame mounted onto front and rear surfaces of the battery cell stack; a module frame that houses the first and second cell block assemblies and is opened in front and rear directions; and an upper plate that covers the upper side surface and front and rear surfaces of the first cell block assembly and the upper side surface and front and rear surfaces of the second cell block assembly. The first and second cell block assemblies are arranged in a direction in which the busbar frames mounted onto the first and second cell block assemblies face each other. The upper plate couples to the bottom part of the module frame between the first and second cell (Continued)

block assemblies and at front and rear sides of the first and second cell block assemblies.

11 Claims, 4 Drawing Sheets

(51) Int. Cl.
| | |
|---|---|
| *H01M 10/6554* | (2014.01) |
| *H01M 50/211* | (2021.01) |
| *H01M 50/262* | (2021.01) |
| *H01M 50/507* | (2021.01) |
| *B60L 58/26* | (2019.01) |

(52) U.S. Cl.
CPC ....... *H01M 50/211* (2021.01); *H01M 50/262* (2021.01); *H01M 50/507* (2021.01); *B60L 58/26* (2019.02)

(56) References Cited

U.S. PATENT DOCUMENTS

| | | |
|---|---|---|
| 2016/0271926 A1 | 9/2016 | Lo |
| 2016/0272036 A1 | 9/2016 | Chen et al. |
| 2016/0272039 A1 | 9/2016 | Cheng |
| 2016/0272040 A1 | 9/2016 | Cheng |
| 2016/0272043 A1 | 9/2016 | Cheng |
| 2016/0272044 A1 | 9/2016 | Cheng |
| 2016/0272045 A1 | 9/2016 | Chen et al. |
| 2016/0272082 A1 | 9/2016 | Chuang |
| 2016/0272083 A1 | 9/2016 | Dai |
| 2016/0272084 A1 | 9/2016 | Chuang |
| 2016/0272085 A1 | 9/2016 | Dai |
| 2016/0272087 A1 | 9/2016 | Lai |
| 2016/0272164 A1 | 9/2016 | Hsiao et al. |
| 2016/0272165 A1 | 9/2016 | Hsiao et al. |
| 2016/0272214 A1 | 9/2016 | Chen |
| 2016/0272242 A1 | 9/2016 | Sham |
| 2016/0272254 A1 | 9/2016 | Wu |
| 2016/0274668 A1 | 9/2016 | Hsiao et al. |
| 2016/0274669 A1 | 9/2016 | Hsiao et al. |
| 2016/0276638 A1 | 9/2016 | Sham |
| 2016/0276721 A1 | 9/2016 | Ho |
| 2016/0276722 A1 | 9/2016 | Ho |
| 2016/0276854 A1 | 9/2016 | Lian |
| 2016/0276855 A1 | 9/2016 | Lian |
| 2016/0276903 A1 | 9/2016 | Lai |
| 2016/0276905 A1 | 9/2016 | Lai |
| 2016/0276963 A1 | 9/2016 | Lai |
| 2016/0325638 A1 | 11/2016 | Dai |
| 2016/0336628 A1 | 11/2016 | Ho |
| 2016/0339797 A1 | 11/2016 | Dai |
| 2016/0355103 A1 | 12/2016 | Lai |
| 2017/0008572 A1 | 1/2017 | Wu |
| 2017/0057374 A1 | 3/2017 | Ho |
| 2017/0057377 A1 | 3/2017 | Lo |
| 2017/0072768 A1 | 3/2017 | Cheng |
| 2017/0077855 A1 | 3/2017 | Lai |
| 2017/0080774 A1 | 3/2017 | Cheng |
| 2017/0080775 A1 | 3/2017 | Cheng |
| 2017/0080776 A1 | 3/2017 | Cheng |
| 2017/0080904 A1 | 3/2017 | Hsiao et al. |
| 2017/0113509 A1 | 4/2017 | Chen et al. |
| 2017/0137052 A1 | 5/2017 | Sham |
| 2017/0149035 A1 | 5/2017 | Sham |
| 2017/0158059 A1 | 6/2017 | Dai |
| 2017/0166032 A1 | 6/2017 | Chen et al. |
| 2017/0182981 A1 | 6/2017 | Hsiao et al. |
| 2017/0185266 A1 | 6/2017 | Dai |
| 2017/0185274 A1 | 6/2017 | Ding |
| 2017/0235371 A1 | 8/2017 | Hsiao et al. |
| 2017/0259490 A1 | 9/2017 | Lo |
| 2017/0282867 A1 | 10/2017 | Sham |
| 2017/0288431 A1 | 10/2017 | Lian |
| 2017/0291470 A1 | 10/2017 | Cheng |
| 2017/0297409 A9 | 10/2017 | Ho |
| 2017/0317325 A1 | 11/2017 | Sham |
| 2017/0317632 A1 | 11/2017 | Lai |
| 2017/0365888 A1 | 12/2017 | Kwon et al. |
| 2018/0001735 A1 | 1/2018 | Chuang |
| 2018/0011629 A1 | 1/2018 | Ding |
| 2018/0029440 A1 | 2/2018 | Cheng |
| 2018/0043747 A1 | 2/2018 | Cheng |
| 2018/0067634 A1 | 3/2018 | Dai |
| 2018/0079277 A1 | 3/2018 | Hsiao et al. |
| 2018/0083563 A1 | 3/2018 | Lai |
| 2018/0091082 A1 | 3/2018 | Lai |
| 2018/0126818 A1 | 5/2018 | Chen et al. |
| 2018/0126864 A1 | 5/2018 | Dai |
| 2018/0138565 A1 | 5/2018 | Lee et al. |
| 2018/0138846 A9 | 5/2018 | Lai |
| 2018/0147912 A1 | 5/2018 | Cheng |
| 2018/0205338 A1 | 7/2018 | Lai |
| 2018/0212293 A1 | 7/2018 | Ho |
| 2018/0226910 A1 | 8/2018 | Lai |
| 2019/0006647 A1 | 1/2019 | Ryu et al. |
| 2019/0296294 A1 | 9/2019 | Hirschbeck et al. |
| 2020/0067040 A1 | 2/2020 | Kim et al. |
| 2020/0127349 A1 | 4/2020 | Park et al. |
| 2020/0411814 A1 | 12/2020 | Ju et al. |
| 2020/0411817 A1 | 12/2020 | You et al. |
| 2021/0036278 A1 | 2/2021 | Tang et al. |
| 2021/0066677 A1 | 3/2021 | Tang et al. |
| 2021/0336287 A1* | 10/2021 | Kim .................... H01M 50/503 |
| 2022/0393322 A1* | 12/2022 | Jang .................... H01M 50/593 |
| 2022/0407143 A1 | 12/2022 | Park et al. |

FOREIGN PATENT DOCUMENTS

| | | |
|---|---|---|
| CN | 111106279 A | 5/2020 |
| CN | 111416076 A | 7/2020 |
| EP | 3 836 248 A1 | 6/2021 |
| EP | 4 016 712 A1 | 6/2022 |
| JP | 2005-310449 A | 11/2005 |
| JP | 2011-129311 A | 6/2011 |
| JP | 2020-35711 A | 3/2020 |
| KR | 10-2015-0050314 A | 5/2015 |
| KR | 10-2017-0036639 A | 4/2017 |
| KR | 10-2017-0128469 A | 11/2017 |
| KR | 10-2019-0074759 A | 6/2019 |
| KR | 10-2065098 B1 | 1/2020 |
| KR | 10-2020-0044580 A | 4/2020 |
| KR | 10-2020-0086170 A | 7/2020 |
| WO | WO 2020/145539 A1 | 7/2020 |

OTHER PUBLICATIONS

International Search Report for PCT/KR2021/014441 (PCT/ISA/210) mailed on Feb. 3, 2022.

\* cited by examiner

【FIG. 1】
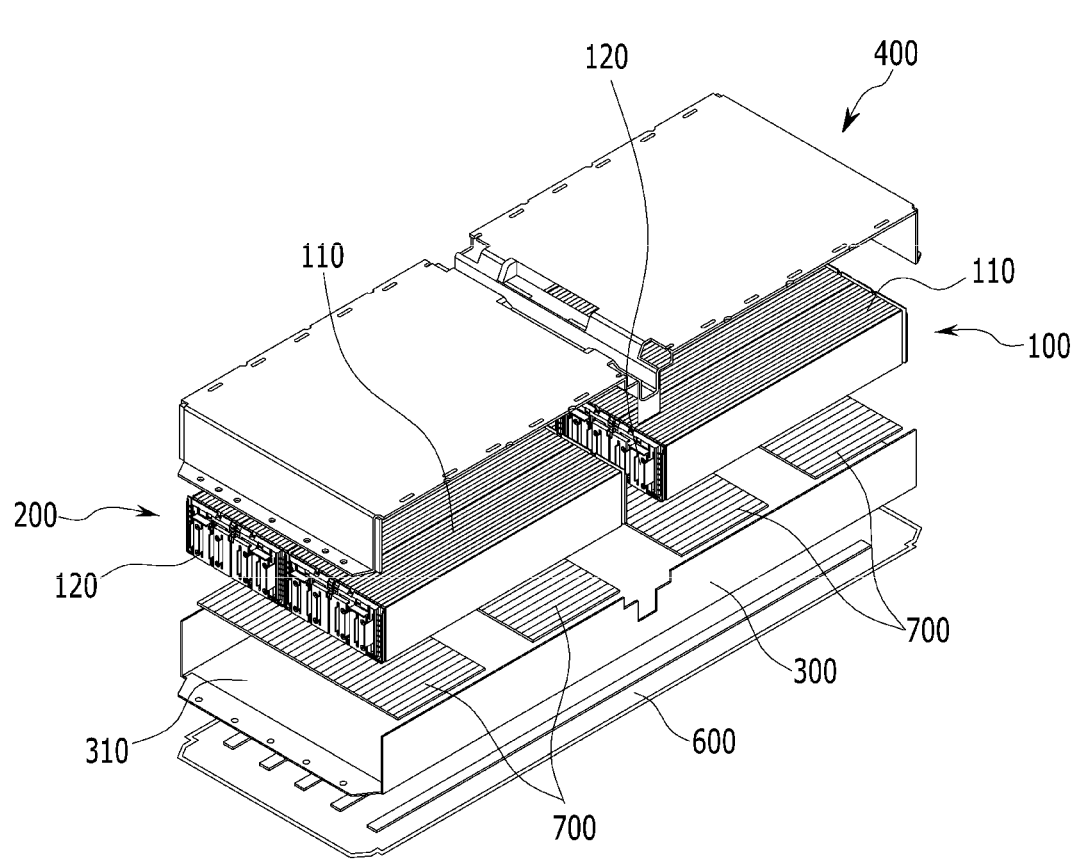

【FIG. 2】
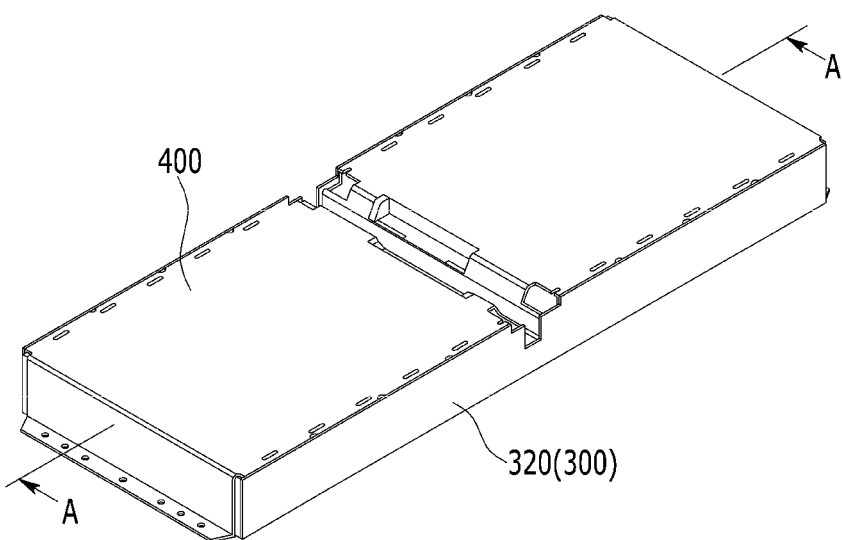
【FIG. 3】
400
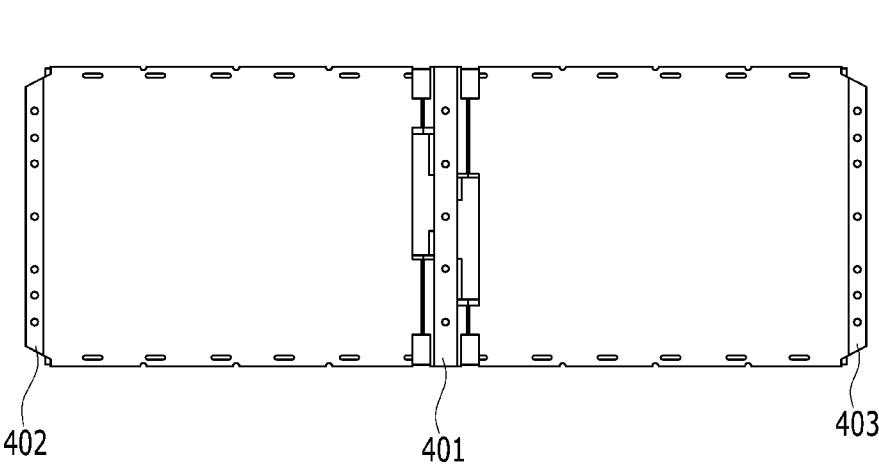

【FIG. 4】
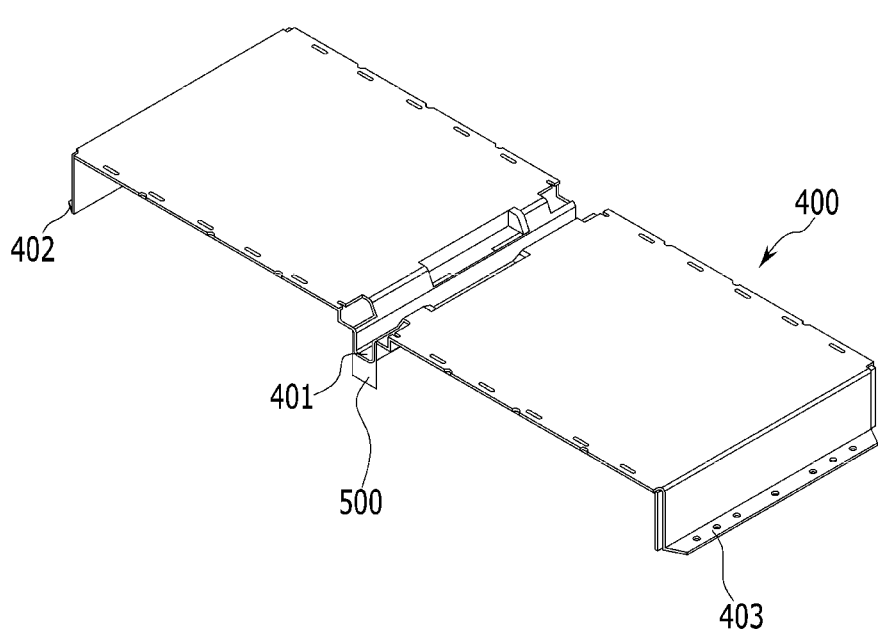
【FIG. 5】
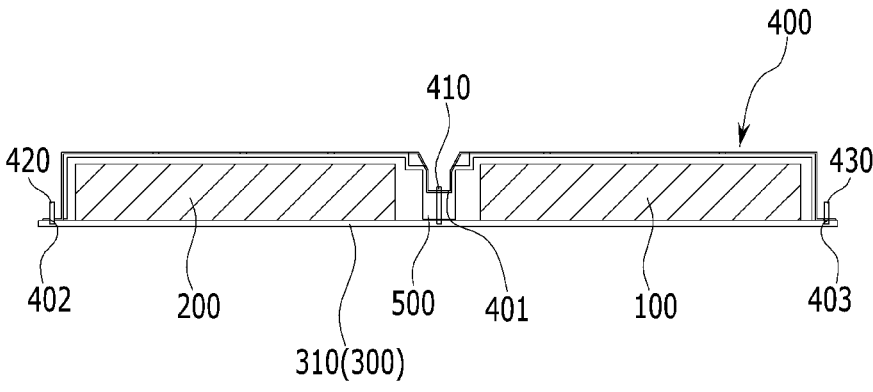

【FIG. 6】
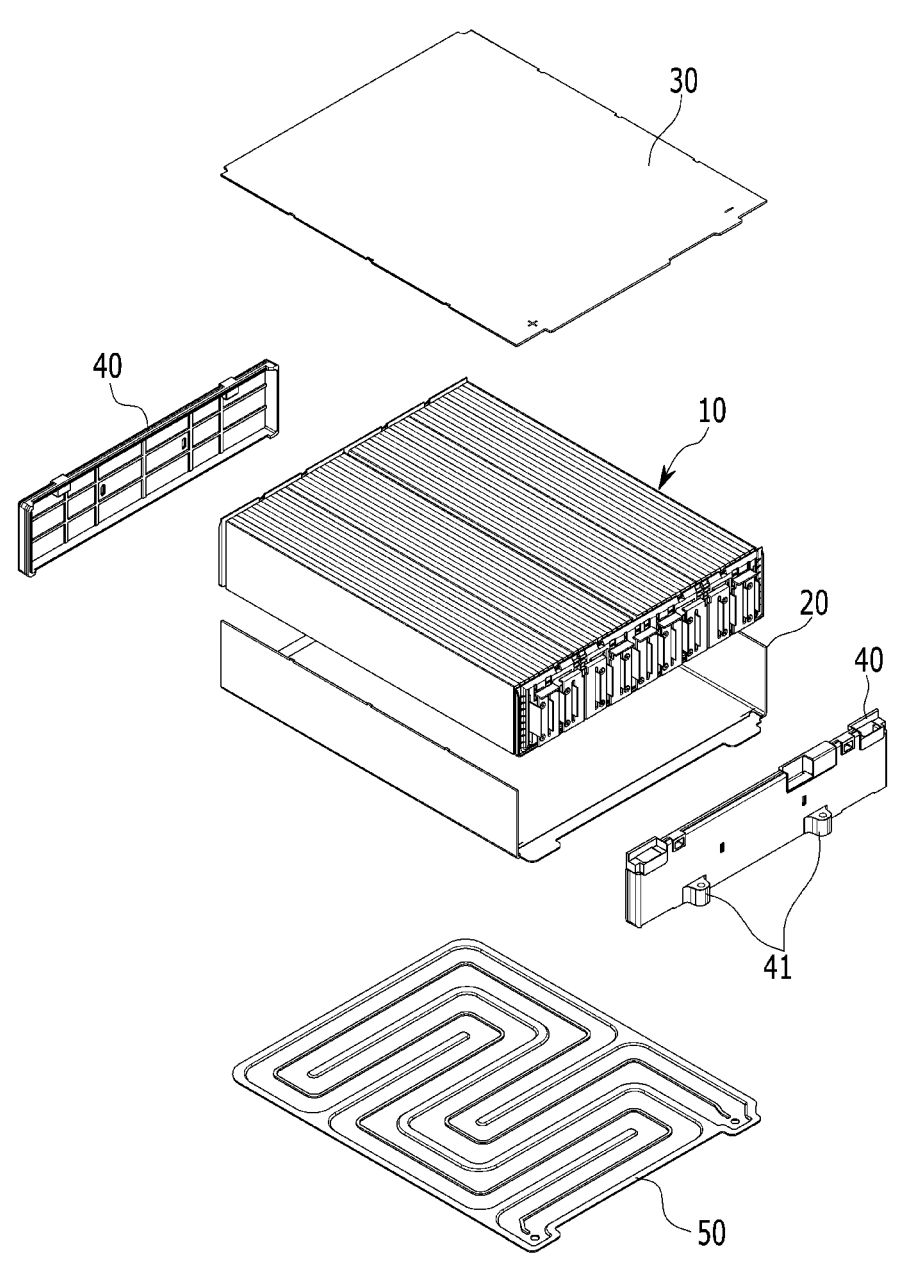
Conventional Art

BATTERY MODULE AND BATTERY PACK INCLUDING THE SAME

TECHNICAL FIELD

Cross Citation with Related Application(s)

This application claims the benefit of Korean Patent Application No. 10-2020-0135446 filed on Oct. 19, 2020 with the Korean Intellectual Property Office, the disclosure of which is incorporated herein by reference in its entirety.

The present disclosure relates to a battery module and a battery pack including the same, and more particularly to a battery module having an expandable structure and a battery pack including the same.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery modules are connected in series/parallel to configure a battery pack, a method of configuring a battery module composed of at least one battery module and then adding other components to at least one battery module to configure a battery pack is common.

Such a battery module includes a battery module stack in which a plurality of battery modules are stacked, a module frame for housing the battery module stack, and an insulating cover and an end plate that covers both side surfaces of the battery cell stack.

Conventionally, a busbar frame was mounted onto the front and rear surfaces of the battery cell stack that is disposed in a direction perpendicular to the stacking direction of the battery cell stack constituting the battery module. Further, an insulating cover was attached to the outside surface of the busbar frame to cut off the electrical connection between the battery cell stack and the busbar frame and the outside. Further, an end plate was mounted onto the outside surface of the insulating cover to physically protect the battery cell stack and the electrical components connected thereto. However, when the battery module is produced by separately providing the insulating cover and the end plate in this way, the structure of the battery module may become complicated.

On the other hand, in the case of a battery module recently installed in electric vehicles, various types of battery module structures have been released in order to efficiently utilize the space inside the vehicle. As the number of cell blocks increases, a demand for an expandable battery module structure capable of utilizing the space inside the vehicle is growing.

At this time, in the case of an expandable battery module structure including at least two or more cell blocks, an insulating cover and an end plate must be separately provided for each battery cell stack when the conventional structure of an end plate and an insulating cover is applied. Therefore, the weight of the battery module may increase, the production process may be lengthened, and the battery module structure itself may become complicated.

DETAILED DESCRIPTION OF THE INVENTION

Technical Problem

It is an object of the present disclosure to provide a battery module that simplifies the structure of an expandable battery module, and a battery pack including the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a first second cell block assembly and a second cell block assembly, each cell block assembly including a battery cell stack stacked in a first direction and a busbar frame mounted onto front and rear surfaces of the battery cell stack; a module frame that houses the first and second cell block assemblies and is opened in a second direction perpendicular to the first direction; and an upper plate that covers an upper side surface and the front and rear surfaces of the first cell block assembly and an upper side surface and the front and rear surfaces of the second cell block assembly, wherein the first and second cell block assemblies are arranged apart from each other in the second direction, and the upper plate is coupled to a bottom part of the module frame between the first and second cell block assemblies and at a front side of the first cell block assembly and a rear side of the second cell block assembly.

The battery module may further comprise an insulating film formed on an inside surface of the upper plate.

The first and second cell block assemblies may be disposed along the second direction.

A cooling plate may be disposed under the bottom part of the module frame.

A thermal conductive resin layer may be formed between the first and second cell block assemblies and the bottom part of the module frame, and the thermal conductive resin layer may be formed on front and rear lower ends of the first cell block assembly and the front and rear lower ends of the second cell block assembly.

A first coupling member may be disposed between the first and second cell block assemblies, second and third coupling members may be at the front side of the first cell block assembly and the rear side of the second cell block assembly, respectively, and the coupling members may couple the upper plate and the module frame.

The upper plate includes an intermediate bottom part formed between the first and second cell block assemblies and front and rear end bottom parts formed in the first direction, and the intermediate bottom part is spaced apart from the bottom part of the module frame, and the first coupling member can connect and couple the intermediate bottom part and the bottom part of the module frame.

The front and rear end bottom parts are in contact with the bottom part of the module frame, and can be coupled to the bottom part of the module frame by the second and third coupling members.

The battery module may further comprise an insulating film formed on an inside surface of the upper plate, wherein the insulating film is spaced apart from the intermediate bottom part between the first and second cell block assemblies and is formed so as to be in contact with the bottom part of the module frame.

According to one embodiment of the present disclosure, there is provided a battery pack comprising the above-mentioned battery module.

Advantageous Effects

According to the present disclosure, by eliminating the end plate and insulating cover structure that were conventionally used in an expandable battery module structure, the battery module can be made lightweight, the assembling property can be improved, the unit production cost of the battery module can be reduced, and parts management cost can be reduced by reducing the number of parts.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view showing a battery module according to an embodiment of the present disclosure;

FIG. 2 is a perspective view showing a state in which the battery module of FIG. 1 is assembled;

FIG. 3 is a top view of FIG. 2 as viewed from above;

FIG. 4 is a perspective view showing an upper plate according to an embodiment of the present disclosure;

FIG. 5 shows a section A-A of FIG. 2, which is a cross-sectional view of a battery module according to an embodiment of the present disclosure; and FIG. 6 is a view showing a structure including an end plate in a conventional battery module as a comparative example.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Now, the battery module according to an embodiment of the present disclosure will be described with reference to FIGS. 1 to 5.

FIG. 1 is an exploded perspective view showing a battery module according to an embodiment of the present disclosure. FIG. 2 is a perspective view showing a state in which the battery module of FIG. 1 is assembled. FIG. 3 is a top view of FIG. 2 as viewed from above. FIG. 4 is a perspective view showing an upper plate according to an embodiment of the present disclosure. FIG. 5 shows a section A-A of FIG. 2, which is a cross-sectional view of a battery module according to an embodiment of the present disclosure.

Referring to FIGS. 1 to 5, the battery module according to an embodiment of the present disclosure includes first and second cell block assemblies 100 and 200 including a battery cell stack 110 and a busbar frame 120 mounted onto front and rear surfaces of the battery cell stack 110, a module frame 300 that houses the first and second cell block assemblies 100 and 200 and is opened in front and rear directions, and an upper plate 400 that covers the upper side surface and front and rear surfaces of the first cell block assembly 100 and the upper side surface and front and rear surfaces of the second cell block assembly 200. The module frame 300 may be U-shaped.

At this time, the first and second cell block assemblies 100 and 200 are arranged apart from each other in a direction in which the busbar frames 120 mounted onto the first and second cell block assemblies 100 and 200 face each other, and the upper plate 400 is coupled to the bottom part of the module frame 300 between the first and second cell block assemblies 100 and 200 and at front and rear sides of the entire first and second cell block assemblies 100 and 200.

The battery cell according to the present embodiment is a secondary battery and can be configured into a pouch type secondary battery. The battery cells can be configured by a plurality of numbers, and the plurality of battery cells can be stacked so as to be electrically connected to each other, thereby forming a battery cell stack 110. The plurality of battery cells may include an electrode assembly, a battery case, and an electrode lead protruding from the electrode assembly, respectively.

According to embodiments of the present disclosure, it may be formed as a large-area cell block in which the number of stacked battery cells is greatly increased as compared with the conventional case. The large-area cell block may include a case where about 32 to 48 battery cells are stacked in one cell block to constitute the battery cell stack 110, as compared with the conventional case where about 12 to 24 battery cells are stacked in one cell block.

The module frame 300 can house the first and second cell block assemblies 100 and 200. The module frame 300 is formed of a bottom part 310 and both side surface parts 320, and can cover the lower surface part and both side surface parts of the entire first and second cell block assemblies 100 and 200. More specifically, the first and second cell block assemblies 100 and 200 are arranged apart from each other in a direction in which the busbar frames face each other, and the module frame 300 can be formed in a size that houses up to the first and second cell block assemblies 100 and 200 and a separation space therebetween, thereby housing the first and second cell block assemblies 100 and 200. At this time, the first and second cell block assemblies 100 and 200 can be disposed along a direction perpendicular to the stacking direction of the battery cell stack 110.

According to the present embodiment, the upper plate 400 may have a shape in which a plurality of concavo-convex parts are formed so as to integrally cover the upper side surface and front and rear surfaces of the first cell block assembly 100 and the upper side surface and front and rear surfaces of the second cell block assembly 200. The upper plate 400 may be formed so as to cover all portions where the busbar frames 120 are located, and at the same time, may be formed so as to cover the upper surface parts of the first and second cell block assemblies 100 and 200.

FIG. 6 is a view showing a structure including an end plate in a conventional battery module as a comparative example.

The conventional battery module includes a battery cell stack 10 formed in a large area, a module frame 20 for housing the battery cell stack 10, an upper plate 30 for covering the upper surface part of the battery cell stack 10, an end plate 40 for covering the front and rear surfaces of the battery cell stack 10, and a heat sink 50 formed below the bottom surface of the module frame 20.

At this time, in addition to the module frame 20 for housing the battery cell stack 10, an upper plate 30 covering the upper surface and an end plate 40 covering the front and rear surfaces are separately provided to form a frame structure of the battery cell stack 10. However, in the case of the structure of the end plate 40, it contains an accessory structure that requires a certain level of strength, for example, it is formed in a size that covers all one side surface of the battery cell stack 10 formed in a large area, and a module mounting part 41 for mounting onto a battery pack is formed on one side, as shown in FIG. 6. Therefore, the weight of the end plate 40 can occupy a significant portion of the total weight of the battery module. In addition, since the upper plate 30 and the end plate 40 must be separately installed in addition to the module frame 20, there is a problem that the assembly process is complicated.

Further, in the case of an expandable battery module structure in which two cell blocks are arranged as in the present disclosure, the weight of the battery module becomes considerable and the structure of the battery module becomes relatively complicated, as compared with the battery module including the single cell block shown in FIG. 6. Therefore, a compact structure for reducing the weight of the battery module and simplifying the structure is essentially required.

Thus, according to the present embodiment, the portions provided with the busbar frame 120 of the first and second cell block assemblies 100 and 200 can be covered by using the integrally formed upper plate 400. Thereby, the end plate provided in the conventional battery module can be eliminated, and both the upper surface part and front and rear surface parts of the two cell block assemblies can be covered with one upper plate 400, thereby reducing the weight occupied by the conventional end plate and simplifying the structure of the expandable large area battery module.

According to the present embodiment, an insulating film 500 can be formed on the inside surface of the upper plate 400 as shown in FIG. 5. Conventionally, a structure was adopted in which an insulating cover was additionally disposed between the end plate and the busbar frame, so that a separate process for assembling the insulating cover between the busbar frame and the end plate was required.

However, according to the present embodiment, the insulating film 500 is attached to the inside surface of the upper plate 400 and thus, at the time of assembling the upper plate 400, the insulating film 500 can also be mounted onto the battery module at the same time, so that insulation of the battery module can be ensured only through a simple assembly process.

According to the present embodiment, a thermal conductive resin layer 700 may be formed between the first and second cell block assemblies 100 and 200 and the bottom part 310 of the module frame 300. The thermal conductive resin layer 700 may be formed on the lower ends of the front and rear sides of the first cell block assembly 100 and the lower ends of the front and rear sides of the second cell block assembly 200, respectively. The thermal conductive resin layer 700 can perform the function of transferring the heat generated from the first and second cell block assemblies 100 and 200 to the outside. The thermal conductive resin layer may include a thermal resin.

According to the present embodiment, the cooling plate 600 may be disposed below the bottom part 310 of the module frame 300. The battery module can be cooled by flowing the refrigerant in the inside of the cooling plate 600. The refrigerant flow path may be formed between the cooling plate 600 and the bottom part 310 of the module frame 300. Thereby, unlike the conventional cooling structure in which a separate heat sink is provided, a structure is adopted in which the coolant flows so that the bottom part 310 of the module frame 300 becomes a part of the coolant flow path, so that the cooling performance of the battery module can be improved and the battery module can be made lightweight.

The upper plate 400 can be coupled to the bottom part 310 of the module frame 300. More specifically, a first coupling member 410 is disposed between the first and second cell block assemblies 100 and 200, the second and third coupling members 420 and 430 are disposed in front and rear sides of the entire first and second cell block assemblies 100 and 200, and the coupling members 410, 420 and 430 can couple the upper plate 400 and the module frame 300.

Looking closely at the coupling structure of the upper plate 400 and the module frame 300, the upper plate 400 includes an intermediate bottom part 401 formed between the first and second cell block assemblies 100 and 200 and front and rear bottom parts formed in front and rear parts 402 and 403 of the entire first and second cell block assemblies 100 and 200. At this time, referring to FIG. 5, the intermediate bottom part 401 is spaced apart from the bottom part 310 of the module frame 300, and the first coupling member 410 can connect and couple the bottom part 401 between the bottom part 401 and the bottom part 310 of the module frame 300.

The insulating film 500 may extend downwardly from the intermediate bottom part 401 between the first and second cell block assemblies 100 and 200, and may be formed to contact the bottom part 310 of the module frame 300. The front and rear end bottom parts 402 and 403 are in contact with the bottom part 310 of the module frame 300, and can be coupled to each other by the second and third coupling members 420 and 430.

Bottom parts that can be coupled with the module frame 300 are formed at both ends and the middle portion of the upper plate 400, and the portion where the bottom parts and the bottom part of the module frame 300 meet is coupled through the coupling members, so that the upper plate 400 and the module frame 300 can be firmly coupled. At the same time, it is possible to physically protect the two cell block assemblies located between the upper plate 400 and the module frame 300.

The battery modules described above can be included in a battery pack, and these battery modules can be included in a battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications can be carried out by those skilled in the art, without deviating from the spirit and scope of the principles of the invention described in the appended claims. Further, these modified embodiments should not be understood individually from the technical spirit or perspective of the present disclosure.

---

[Description of Reference Numerals]

| | |
|---|---|
| 100: first cell block assembly | 110: battery cell stack |
| 120: busbar frame | 200: second cell block assembly |
| 210: battery cell stack | 220: busbar frame |
| 300: module frame | 310: module frame bottom part |
| 320: both side surface parts of module frame | 400: upper plate |
| 401: intermediate bottom part | 402: front end bottom part |
| 403: rear end bottom part | 410: first coupling member |
| 420: second coupling member | 430: third coupling member |
| 500: insulating film | 600: cooling plate |
| 700: thermal conductive resin layer | |

---

The invention claimed is:

1. A battery module comprising:
   a first block assembly and a second cell block assembly, each block assembly including a battery cell stack stacked in a first direction and a busbar frame mounted onto front and rear surfaces of the battery cell stack;
   a module frame that houses the first and second cell block assemblies and is opened in a second direction perpendicular to the first direction;
   an upper plate that covers an upper side surface and the front and rear surfaces of the first cell block assembly and an upper side surface and the front and rear surfaces of the second cell block assembly; and
   an insulating film formed on an inside surface of the upper plate
   wherein the first and second cell block assemblies are arranged apart from each other in the second direction,
   wherein the upper plate is coupled to a bottom part of the module frame between the first and second cell block assemblies and at a front side of the first cell block assembly and a rear side of the second cell block assembly,
   wherein the upper plate comprises a front end bottom part, a rear end bottom part and an intermediate bottom part formed between the front end bottom part and the rear end bottom part,
   and
   wherein the insulating film extends downwardly from the intermediate bottom part between the first and second cell block assemblies and is formed so as to be in contact with the bottom part of the module frame.

2. The battery module according to claim 1, wherein the first and second cell block assemblies are disposed along the second direction.

3. The battery module according to claim 1, wherein a cooling plate is disposed under the bottom part of the module frame.

4. The battery module according to claim 1, wherein a thermal conductive resin layer is formed between the first and second cell block assemblies and the bottom part of the module frame, and the thermal conductive resin layer is formed on front and rear lower ends of the first cell block assembly and the front and rear lower ends of the second cell block assembly.

5. The battery module according to claim 1, wherein a first coupling member is disposed between the first and second cell block assemblies, and second and third coupling members are at the front side of the first cell block assembly and the rear side of the second cell block assembly, respectively, and
   wherein the coupling members couple the upper plate and the module frame.

6. The battery module according to claim 5, wherein the intermediate bottom part is spaced apart from the bottom part of the module frame, and the first coupling member connects and couples the intermediate bottom part and the bottom part of the module frame.

7. The battery module according to claim 6, wherein the front end bottom part and the rear end bottom part are in contact with the bottom part of the module frame, and are coupled to the bottom part of the module frame by the second and third coupling members.

8. The battery module according to claim 1,
   wherein the module frame has a bottom part and side walls extending in the second direction, and
   wherein a top edge of each side wall has a notch, the intermediate bottom part fitting into the notches.

9. The battery module according to claim 8, wherein the intermediate bottom part is spaced above the bottom part of the module frame, and a first coupling member connects and couples the intermediate bottom part and the bottom part of the module frame.

10. The battery module according to claim 1, wherein the insulating film extends downwardly from edges of the intermediate bottom part.

11. A battery pack comprising the battery module according to claim 1.

* * * * *